United States Patent

[11] 3,615,720

| [72] | Inventor | Leif Brudal Knutrud |
| | | Oslo, Norway |
| [21] | Appl. No. | 783,357 |
| [22] | Filed | Dec. 12, 1968 |
| [45] | Patented | Oct. 26, 1971 |
| [73] | Assignee | Frionor Norsk Frossenfisk A/L |
| | | Oslo, Norway |
| [32] | Priority | Dec. 15, 1967 |
| [33] | | Norway |
| [31] | | 171,000 |

[54] METHOD FOR THE PRODUCTION OF DEEP-FROZEN FISH FILLET BLOCKS
3 Claims, 1 Drawing Fig.

[52] U.S. Cl. ................................................. 99/195,
62/303, 99/174, 99/188
[51] Int. Cl. ....................................................... A23b 3/06
[50] Field of Search .......................................... 99/174,
192, 194, 195; 62/303, 351; 34/5; 100/94, 95, 96

[56] References Cited
UNITED STATES PATENTS

| 1,773,080 | 8/1930 | Birdseye .................... | 99/195 X |
| 1,873,130 | 8/1932 | Jones et al. ................. | 99/194 X |
| 2,114,530 | 4/1938 | Gorton, Jr. ................. | 99/174 |
| 2,851,367 | 9/1958 | Heen .......................... | 99/195 |
| 2,930,139 | 3/1960 | Brynko et al. .............. | 34/5 |
| 3,100,713 | 8/1963 | Grant .......................... | 99/195 X |
| 3,320,768 | 5/1967 | Barrett ........................ | 62/303 |
| 2,696,442 | 12/1954 | Allbright .................... | 99/351 X |

FOREIGN PATENTS

| 345,329 | 3/1931 | Great Britain .............. | 99/194 |

*Primary Examiner*—Norman Yudkoff
*Assistant Examiner*—F. E. Drummond
*Attorney*—Johnson, Dienner, Emrich, Verbeck & Wagner ABSTRACT: After fish fillets have been packed in a surrounding, but not airtight packing and before the fillet mass is frozen to a block, said packing with the fillet mass therein is subjected to a separate process step involving the application of a nearly total vacuum and the subsequent abrupt removal thereof. The air in the voids between the individual fillets in the mass and between the fillets and the surrounding walls of the package is withdrawn from the voids when the vacuum is applied. When the vacuum is removed, all the enclosed voids will collapse, i.e. not only the voids within the block but also the voids opening onto the boundaries thereof, since the latter voids are closed by the walls of the packing.

PATENTED OCT 26 1971
3,615,720
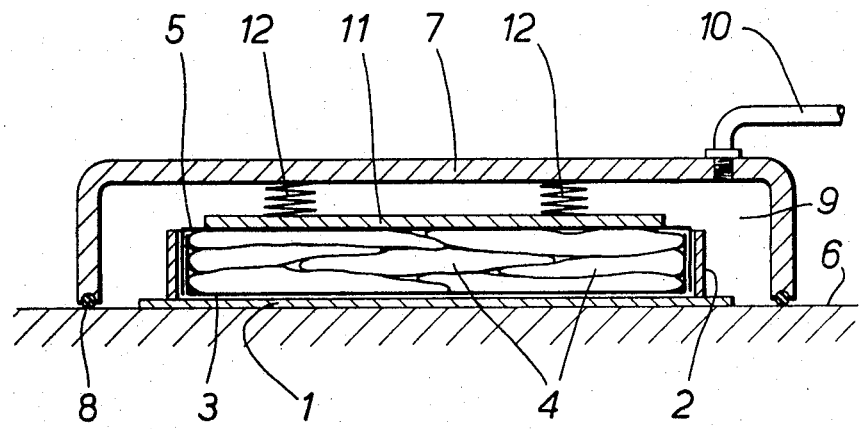
INVENTOR
Leif Brudal Knutrud
BY
ATTORNEYS

METHOD FOR THE PRODUCTION OF DEEP-FROZEN FISH FILLET BLOCKS

The present invention relates to a method for the production of deep-frozen fish fillet blocks that are later to be divided into smaller units. In the production of such blocks the fillets are placed in a mold having an open top or, if desired, in a packing inserted into the mold, whereafter the mold with the fillets therein is placed in a freezing apparatus, for instance a plate freezer. The mold may be in the form of a pan, or it may consist of a frame resting on a bed, for example an aluminum tray. The packing may be in the form of two box halves, a bottom and a top half that are placed on top of each other and at the sides are surrounded by the frame. The fish fillet blocks may have different sizes, but they are ordinarily relatively flat, and a frequency used block size has a length of about 60 cm., a width of about 50 cm., and a height of about 7.5 cm.

As indicated, such fish blocks are divided into smaller units of a size between 20 g. and about one-half kg. These units may be subjected to a further treatment, and especially for the smaller units it is usual to subject them to a breading and, if desired, to cook them in oil before they are again packed and frozen.

It is of great importance for the further treatment of the large fish blocks that the blocks are homogeneous, that is that voids in the blocks are avoided as far as possible. Such voids would entail substantial variations in the weight of the divided units, waste of raw material due to trimming of the blocks, and sometimes an aftertreatment of the units to fill recesses in the surfaces thereof.

Voids in the block occur especially when
1. the individual fillets are not appropriately or carefully placed,
b 2. the fillets are especially large, and
3. the fish is in rigor mortis so that the fillets will not yieldingly adapt themselves to each other.

With respect to the laying of the trimmed fillets in an appropriate way in the mold, for example in cartons erected in steel frames, much effort is devoted to training and supervising the workers, but due to changing personnel, unskilled labor and the demand for fast laying, it is impossible to eliminate the voids entirely. With respect to large fillets attempts are made to neutralize the trend for voids to be formed along the sides thereof by splitting the fillets. It has been believed that the problem with respect to the formation of voids due to the fish being in rigor mortis can only be solved by letting the fish lie and get older and more pliable. However, it will be appreciated that this is an unsatisfactory solution, as any delay in freezing results in a depreciation of the quality of the fish.

The object of the invention is to provide a method for the production of deep-frozen fish fillet blocks as indicated above, by which voids in the frozen blocks can be avoided in a simple way and without any substantial increase in production costs, even though the processed fish may be in rigor mortis, and without the necessity of imposing rigid requirements with respect to careful laying and to the size of the fillet pieces placed in the mold.

According to the invention this is achieved due to the fact that before the fish block in the mould is passed to the freezing apparatus it is subjected to a vacuum which is subsequently eliminated.

In this way all the substantially enclosed voids within the block and between the block and the mold walls or the packing walls respectively, that is the voids that are not in open communication with the space around the mold, are eliminated, since the air pressure in these voids will be reduced to near zero, the result being that the voids will collapse when the vacuum is eliminated. Therefore, the blocks will be substantially free of voids on the bottom side, along the lateral faces, and within the block. However, the blocks will usually still have irregularities or recesses in their upper surface. In order also to eliminate these recesses, according to the invention it is further suggested that a substantially plane surface should be kept in pressure contact with the upper surface of the fish block during the elimination of the vacuum.

The invention will now be described in more detail, reference being had to the drawing, which highly diagrammatically illustrates a way of carrying out the invention.

The drawing illustrates a plate 1 of aluminum and a rectangular frame 2 resting on the plate 1. In this frame a cardboard box 3 may first be placed, whereupon the fillets 4 are placed in the box in a suitable manner. Then a cover 5, which may be a box similar to the box 3, may be placed over the fish fillet block, the sides of the box 5 being inserted between the frame 2 and the sides of the box 3.

According to the invention the mold composed of the plate 1 and the frame 2, as well as the boxes 3 and 5 and the fillets 4 therein are then placed in a vacuum apparatus, which is illustrated in the drawing in a highly diagrammatical way and is indicated as consisting of a table 6 and a hood 7, which can be moved pivotally or otherwise with respect to the table and placed over the mold and the fish fillet block so as to seal against the table 6 by means of gaskets 8, thereby forming a closed chamber 9 that may be placed under vacuum by means of an evacuation conduit 10.

When the hood 7 is placed over the fish block, a plane rigid plate 11 connected with hood 7 is forced against the upper surface of the block. The force by which the plate 11 is kept in contact with the fish block should preferably be constant, irrespective of any movement of the fish block, and therefore preferably a pneumatic pressure is used to force the plate 11 against the fish block. However, for the sake of simplicity springs 12 for forcing the plate 11 downwards are illustrated in the drawing.

As indicated, the drawing is highly diagrammatical, and it is only included in order better to illustrate the method according to the invention. In this connection it may be noted that in tests with the method excellent results have been achieved by using an ordinary vacuum apparatus of the kind used for vacuum packing of food articles.

What I claim is:
1. A method for the production of a homogeneous, deep-frozen fish fillet block which is substantially free of voids, consisting essentially of:
   a. placing a fillet mass in a substantially rigid mold and closing the mold so as to surround the fillet mass snugly and completely, but so to permit air to escape from the interior of the mold, said fillet mass containing voids and defining additional voids between said mass and the mold walls surrounding said mass,
   b. thereafter subjecting the interior of the closed mold with the fillets therein in an enclosure to a vacuum sufficient to reduce the air pressure in said voids to near zero while forcing, independently of said vacuum, the closed mold against the top of the mass of fillets, and then removing the vacuum, whereby said voids will collapse, and
   c. finally freezing the fillet mass, which is now substantially free of voids, in the mold.
2. A method as claimed in claim 1, in which the mold comprises a packing positioned in a frame resting on a plate.
3. A method as claimed in claim 1, in which the closed mold with the fillets therein is subjected for a period of some seconds to said vacuum as a separate, independent step between the step of filling and closing the mold and the step of freezing the mass in the mold.